Aug. 7, 1928.
G. W. ELSEY
1,679,414
MEANS FOR CONNECTING THE OPERATING MEMBERS OF VEHICLE
REBOUND CHECKS WITH VEHICLE PARTS
Filed May 28, 1926
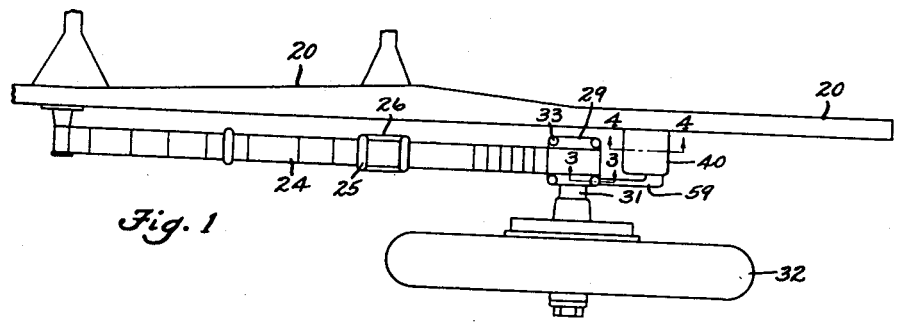
Fig. 1
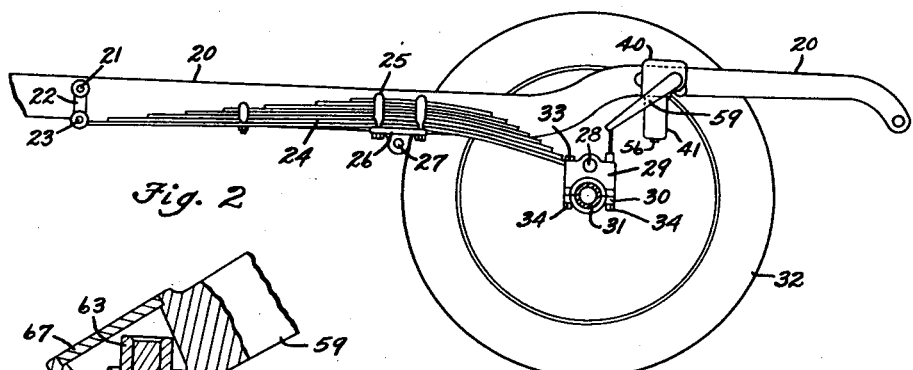
Fig. 2
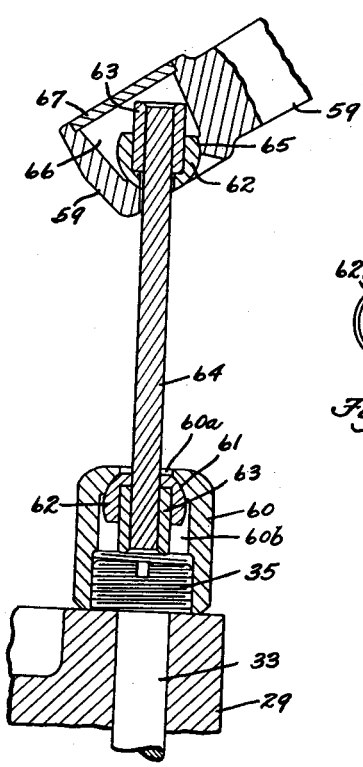
Fig. 3
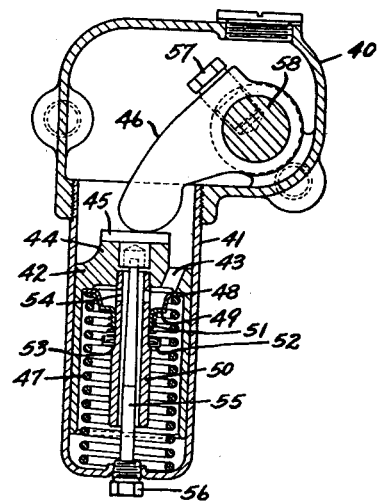
Fig. 5
Fig. 4
Inventor
George W. Elsey
By Spencer Sewall & Hardman
his Attorneys Patented Aug. 7, 1928.

1,679,414

UNITED STATES PATENT OFFICE.

GEORGE W. ELSEY, OF ANDERSON, INDIANA, ASSIGNOR, BY MESNE ASSIGNMENTS, TO DELCO-REMY CORPORATION, OF DAYTON, OHIO, A CORPORATION OF DELAWARE.

MEANS FOR CONNECTING THE OPERATING MEMBERS OF VEHICLE REBOUND CHECKS WITH VEHICLE PARTS.

Application filed May 28, 1926. Serial No. 112,265.

This invention relates to rebound checks for automotive vehicles. Such rebound checks usually include a housing attached to the frame of the vehicle and a movable operating member which extends from the housing and is attached to the axle.

One of the objects of the invention is to simplify the means for securing the movable operating member of the rebound check to an axle of the vehicle.

Further objects and advantages of the present invention will be apparent from the following description, reference being had to the accompanying drawings, wherein a preferred form of embodiment of the present invention is clearly shown.

In the drawings:

Figs. 1 and 2 are fragmentary plan and side views respectively of an automobile chassis having the present invention applied thereto.

Fig. 3 is a fragmentary sectional view on an enlarged scale and taken on the line 3—3 of Fig. 1.

Fig. 4 is a sectional view on an enlarged scale of the rebound check shown in Figs. 1 and 2, and the section is taken substantially on the line 4—4 of Fig. 1.

Fig. 5 is a plan view of one of the members providing a ball and socket connection between the rebound check and the axle.

In the drawings, 20 designates the rear portion of one of the side frame members of an automobile chassis. The frame 20 supports a stud 21 which is attached by link 22 and a shackle bolt 23 to a multiple leaf spring 24. The intermediate portions of the leaves of the spring 24 are clamped together by U-bolts 25 and a plate 26. The plate 26 is pivotally supported by the frame upon a stud 27 attached thereto. The rear end of the spring 24 is attached by a shackle bolt 28 to a bearing member 29. Bearing member 29 cooperates with a bearing member 30 providing a bearing for a head axle 31 which is supported by vehicle road wheels, one of which is indicated by numeral 32. If the road wheels 32 are the driving wheels, they are driven by a live axle not shown but housed by the head axle 31. The members 29 and 30 are secured about the axle 31 by bolts 33 and nuts 34. For a purpose to be described one of the bolts 33 is provided with a threaded head 35 as shown in Fig. 3.

The rebound check includes a housing 40 which is secured in any suitable manner to the frame 20. A cylinder 41 is supported by the housing 40 and has its upper end opening into the said housing. The cylinder 41 slidingly supports a piston 42 provided with one or more apertures 43 through its head 44. The head 44 carries a wear piece 45 which is urged upwardly against a lever 46 by a spring 47 which bears at its lower end against the bottom of the cylinder 41 and at its upper end against a valve seat member 48 which is retained in position by the spring 47. A check valve 49 cooperates with the valve seat 48 and is supported and guided by a metering tube 50 which is screwed into the piston head 44. The valve 49 is yieldingly urged against the seat 48 by a spring 51 maintained in position by washer 52 seated by a shoulder 53 which is provided by the tube 50. The tube 50 is provided with side passages 54 connecting its central passage with the space against valve seat member 48. Thus the check valve is provided with a by-pass which is controlled by a metering pin 55 attached to a plug 56 which threadedly engages a hole tapped in the bottom of the cylinder 41. Lever 46 is attached by a screw 57 to a shaft 58 which extends exteriorly of the housing 40 and is connected with a lever 59. Advantage is taken of the fact that the operating lever 59 may be located in the vertical plane of the bolts 33. Therefore one of the bolts 33 is used as part of the means for attaching the operating lever 59 to the axle 31.

As shown in Fig. 3, one of the bolts 33 is provided with a threaded head 35. The threaded head 35 is engaged by an internally threaded tube 60 having a spherical shoulder portion 61 for receiving a ball member 62. The diameter of the member 62 is less than the diameter of the bore $60^b$ of the tube 60 and greater than the diameter of the bore $60^a$ so that the ball member cannot pass upwardly through the tube 60 as viewed in Fig. 3. The ball member 62 is provided with a notch $62^a$ extending from its periphery to its center and of a width sufficient to permit it to receive a cable 64. The ball member 62 is provided with a central recess $62^b$ for receiving a sleeve 63 which is permanently attached to the cable. When the sleeve 63 is located within the recess $62^b$ the cable is maintained centrally of the ball member 62. The bore 60ᵃ of the tube 60 is slightly larger in diameter than the sleeve 63 so as to permit passing the sleeve and cable through the tube 60 before attaching the ball member 62. The upper end of the cable 64 is connected with a similar sleeve 63 seated within a similar ball member 62 which is engaged by a spherical shoulder portion 65 which is provided adjacent the free end of the lever 59. Lever 59 is provided with a recess 66 for receiving the upper end of the cable 64 and the parts 62 and 63. This recess 66 may be filled with grease for lubricating the engaging surfaces of the ball and socket members 62 and 65, and the recess 66 may be closed by a disc 67 which is press fitted into the position shown in Fig. 3. The tube 60 may also receive grease for lubricating the lower ball and socket members 61 and 62. To disconnect the cable 64 from the axle 31 the tube 60 is unscrewed from the bolt head 35 and is moved upwardly past the ball member 52 to permit removal of the ball member from the sleeve and cable. Then the tube 60 may be passed downwardly over the lower end of the sleeve 63 and cable 64.

The rebounding of the vehicle frame 20 from the axle 30 produces counterclockwise rotation of the lever 59 and of the lever 46 shown in Fig. 4. This will cause the piston 42 to move downwardly and the check valve 48 to be closed. The checking of the rebound will be effected due to the flow of a relatively viscous fluid contained within the cylinder 41 upwardly through the metering passage provided between the tube 50 and the metering pin 55.

Further description of the rebound check will be found in my copending application of Serial No. 99,371, filed April 2, 1926, and in the copending application of Edward R. Godfrey, Serial No. 99,394, filed April 2, 1926.

It is apparent from the foregoing description that the rebound check operating arm 59 has been secured to the axle 31 in an exceedingly simple manner, and without the use of additional clamps which are usually employed for attaching to the axle a cable or other flexible member connected with the movable operating member of the rebound check.

While the form of embodiment of the present invention as herein disclosed, constitutes a preferred form, it is to be understood that other forms might be adopted, all coming within the scope of the claims which follow.

What is claimed is as follows:

1. A device for connecting the operating member of a vehicle rebound check with a vehicle part, comprising, in combination, a cable carrying a sleeve member, a part providing a tubular recess, the end wall of which is provided with an aperture for receiving the cable and sleeve, the material of the part surrounding the aperture being shaped to provide internally, a spherical recess, a ball member having a spherical surface adapted to be received by the spherical recess and having a notch extending from its periphery to its central portion for receiving the cable and having a recess for receiving the sleeve on the end of the cable.

2. A device for connecting the operating member of a vehicle rebound check with a vehicle part, comprising, in combination, a cable carrying a shoulder member, a part providing a tubular recess, the end wall of which is provided with an aperture for receiving the cable and shoulder member, the material of the part surrounding the aperture being shaped to provide, internally, a spherical recess, a ball member having a spherical surface adapted to be received by the spherical recess and having a notch extending from its periphery to its central portion, the notch being less in width than the diameter of the shoulder member on the cable so that the shoulder abuts the ball member.

3. A device for connecting the operating member of a vehicle rebound check with a vehicle part, comprising, in combination, a device for securing the spring of the vehicle to the axle of the vehicle, said device having a threaded part extending toward the operating member of the rebound check, a cable adapted to be attached to the operating member of the rebound check and provided adjacent one end with a shoulder member, a tubular member threadedly connected with the threaded part of the spring securing device and having an apertured end wall for receiving the cable and shoulder member, the material of the tubular member surrounding the aperture being shaped to provide, internally, a spherical recess, a ball member having a spherical surface adapted to be received by the spherical recess and having a notch extending from its periphery to its central portion for receiving the cable and having a recess for receiving the shoulder member on the end of the cable.

In testimony whereof I hereto affix my signature.

GEORGE W. ELSEY.